US011292175B2

United States Patent
Xu et al.

(10) Patent No.: US 11,292,175 B2
(45) Date of Patent: Apr. 5, 2022

(54) ASYMMETRIC CO-ROTATING MULTI-SCREW EXTRUSION DEVICE, EXTRUDER AND PROCESSING METHOD THEREOF

(71) Applicant: WUYI UNIVERSITY, Jiangmen (CN)

(72) Inventors: Baiping Xu, Jiangmen (CN); Huiwen Yu, Jiangmen (CN); Biao Liu, Jiangmen (CN); Shuping Xiao, Jiangmen (CN); Yaoxue Du, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 274 days.

(21) Appl. No.: 16/661,095

(22) Filed: Oct. 23, 2019

(65) Prior Publication Data

US 2021/0023759 A1 Jan. 28, 2021

(30) Foreign Application Priority Data

Jul. 26, 2019 (CN) .......................... 201910683573.1

(51) Int. Cl.
*B29C 48/52* (2019.01)
*B29C 48/405* (2019.01)
*B29C 48/595* (2019.01)

(52) U.S. Cl.
CPC ............ *B29C 48/52* (2019.02); *B29C 48/405* (2019.02); *B29C 48/595* (2019.02)

(58) Field of Classification Search
CPC ...... B29C 48/52; B29C 48/405; B29C 48/595; B29C 48/425; B29C 48/565; B29C 48/64
See application file for complete search history.

(56) References Cited

U.S. PATENT DOCUMENTS

| | | | | |
|---|---|---|---|---|
| 3,900,187 A | * | 8/1975 | Loomans | B29B 7/489 366/85 |
| 6,048,088 A | * | 4/2000 | Haring | B29B 7/489 366/85 |
| 2013/0089634 A1 | * | 4/2013 | Xu | B29B 7/485 425/226 |
| 2020/0198209 A1 | * | 6/2020 | Skrabala | B29C 48/64 |

* cited by examiner

*Primary Examiner* — Galen H Hauth
(74) *Attorney, Agent, or Firm* — ARC IP Law, PC; Joseph J. Mayo

(57) ABSTRACT

Disclosed is an asymmetric co-rotating multi-screw extrusion device, an extruder, and a processing method thereof. The barrel is provided with a feed port located at one end of the screw mechanism and a discharge port located at the other end of the screw mechanism, and the barrel comprises a conveying section, a melting section, an exhaust section, and a mixing extrusion section sequentially arranged from a side thereof where the feed port is located, wherein the exhaust section is provided with an exhaust hole. The screw mechanism comprises at least a first screw and a second screw arranged parallel to the first screw, wherein at least one of the first screw and the second screw has a cross-sectional profile comprising an arc forming a radial step between a root and a crest thereof, and the first screw and the second screw are asymmetrically inter-meshed and co-rotated at the same speed.

8 Claims, 7 Drawing Sheets

ASYMMETRIC CO-ROTATING MULTI-SCREW EXTRUSION DEVICE, EXTRUDER AND PROCESSING METHOD THEREOF

CROSS REFERENCE TO RELATED APPLICATION

This application claims the benefit of CN patent application No. 201910683573.1 filed on Jul. 26, 2019, the entire disclosure of which is hereby incorporated herein by reference.

BACKGROUND OF THE INVENTION

Field of the Invention

The present disclosure relates to the field of multi-screw extruder technologies, and more particularly, to an asymmetric co-rotating multi-screw extrusion device, an extruder, and a processing method thereof.

Description of the Related Art

A co-rotating twin-screw extruder with a self-cleaning function mainly comprises a barrel and two screws installed in an inner cavity of the barrel in parallel. The two screws rotate at the same speed and sweep with each other to realize the self-cleaning function. Generally speaking, the left and right screws of the co-rotating screws have a completely identical shape, except that the screws are arranged at a stagger angle. For a single screw, its cross-sectional geometry is axisymmetric. The extruder has a twin-screw inter-meshing area which is a key part for melting and mixing, however, the existence of the symmetry leads the screws to have the same intermeshing mode in the intermeshing areas, and the local stacking and deceleration of materials lead to a relaxation effect, the improvement of melting and mixing effects of materials in the extruder is thus limited. On the other hand, the existence of the symmetry leads to axial closure in the upper and the lower intermeshing sections of the self-cleaning co-rotating twin screws. During the melting and mixing processes of materials, there exist independent topological flow channels, and there is almost no axial back mixing between the flow channels, which also leads to fluctuation in product performance caused by component fluctuation during a metering-feeding process of materials. The limited Improvement of the axial back mixing effect in an extrusion process shall be a key problem to be settled for the conventional co-rotating twin screws.

BRIEF SUMMARY OF THE INVENTION

The present disclosure aims to solve at least one of the technical problems described above in related art to some extent. For this purpose, the present disclosure provides an asymmetric co-rotating multi-screw extrusion device, wherein each of the screws has a cross-sectional profile comprising one or more circular arcs between a root and a crest thereof, to break the symmetry. Resulting from above, the screws inter-meshed with each other can have different shapes and different axial opening degrees of flow channels in the upper and the lower intermeshing areas, thus to provide a back mixing effect in the axial direction, which can improve melting, mixing and exhaust efficiencies.

The technical solutions used in the present disclosure to solve the technical problems thereof are as follows.

An asymmetric co-rotating multi-screw extrusion device comprises:
a barrel, and
a screw mechanism, arranged inside the barrel,
wherein,
the barrel is provided with a feed port located at one end of the screw mechanism and a discharge port located at the other end of the screw mechanism, and the barrel comprises a conveying section, a melting section, an exhaust section, and a mixing extrusion section sequentially arranged from a side thereof where the feed port is located, wherein the exhaust section is provided with an exhaust hole; and
the screw mechanism comprises at least a first screw and a second screw arranged parallel to the first screw, wherein at least one of the first screw and the second screw has a cross-sectional profile comprising an arc forming a radial step between a root and a crest thereof, and the first screw and the second screw are asymmetrically inter-meshed and co-rotated at the same speed.

Further, the second screw and the first screw have spirals, which are steps in a circular cylinder shape.

Further, the cross-sectional profiles of the first screw and the second screw have a plurality of circular arcs, forming a plurality of radial steps between the roots and the crests of the first screw and the second screw.

Further, the cross-sectional profile of the second screw is formed by circular arcs and curved arcs which are connected, the number of the circular arcs and the curved arcs of the second screw is the same as that of the circular arcs and the curved arcs of the cross-sectional profile of the first screw, and the circular arcs of the second screw are tangent to the corresponding circular arcs of the first screws.

Further, the screw mechanism comprises a third screw asymmetrically inter-meshed with the first screw or the second screw, and the third screw has a cross-sectional profile comprising one or more circular arcs formed between a root and a crest thereof.

Further, the first screw, the second screw, and the third screw are double-headed screws.

Further, the screw mechanism comprises a left-hand thread structure and a kneading block structure installed at a local position therein.

Further, the first screw and the second screw have outermost edges tangent to an inner wall of the barrel.

A multi-screw extruder comprises the asymmetric co-rotating multi-screw extrusion device described above.

A processing method performed on the asymmetric co-rotating multi-screw extrusion device described above comprises the following steps of:
pushing materials to move forward in a direction towards a flow channel of the melting section, by co-rotating the first screw and the second screw at the same speed along respective screw axes, after the materials are fed into the flow channel of the conveying section from the feed port;
melting the materials to melt, through an accelerated melting process due to a strong axial back mixing effect, when the materials are moved into the flow channel of the melting section,
venting gas from the exhaust port under the action of the first screw and the second screw, and further moving the materials in a direction towards a flow channel of the mixing extrusion section, after the melted materials are moved into the flow channel of the exhaust section from the flow channel of the melting section; and
plasticizing and mixing the melted materials under the strong axial back mixing effect between the first screw and the second screw, and stably extruding the melted materials from the discharge port, after the melted materials are moved into the flow channel of the mixing extrusion section.

One or more technical solutions in the present disclosure at least have the following beneficial effects:

1. According to the present disclosure, each of the first screw and the second screw has one or more circular arc pairs between the root and the crest in the cross-sectional profile thereof to break the symmetry. The corresponding circular arc pairs are tangentially inter-meshed, allowing the screws inter-meshed with each other to have different shapes and different axial opening degrees in the upper and lower intermeshing areas of the flow channels, and thereby to introduce an enhancement mechanism of axial back mixing to effectively accelerate the melting, plasticizing, mixing and exhaust efficiencies;

2. According to the present disclosure, the screw mechanism ensures that the first screw and the second screw are tightly inter-meshed and co-rotate at the same speed. The two screws are constructed to wipe with each other, thus realizing a self-cleaning effect in a processing operation.

3. The present disclosure can greatly reduce the use of a kneading block, has a remarkable energy-saving effect, makes residence time distribution in the processing process narrower, and improves the processing efficiency and effect.

BRIEF DESCRIPTION OF THE DRAWINGS

The present disclosure is further described below by embodiments with reference to accompanying drawings, in which.

DETAILED DESCRIPTION

Figure 1:
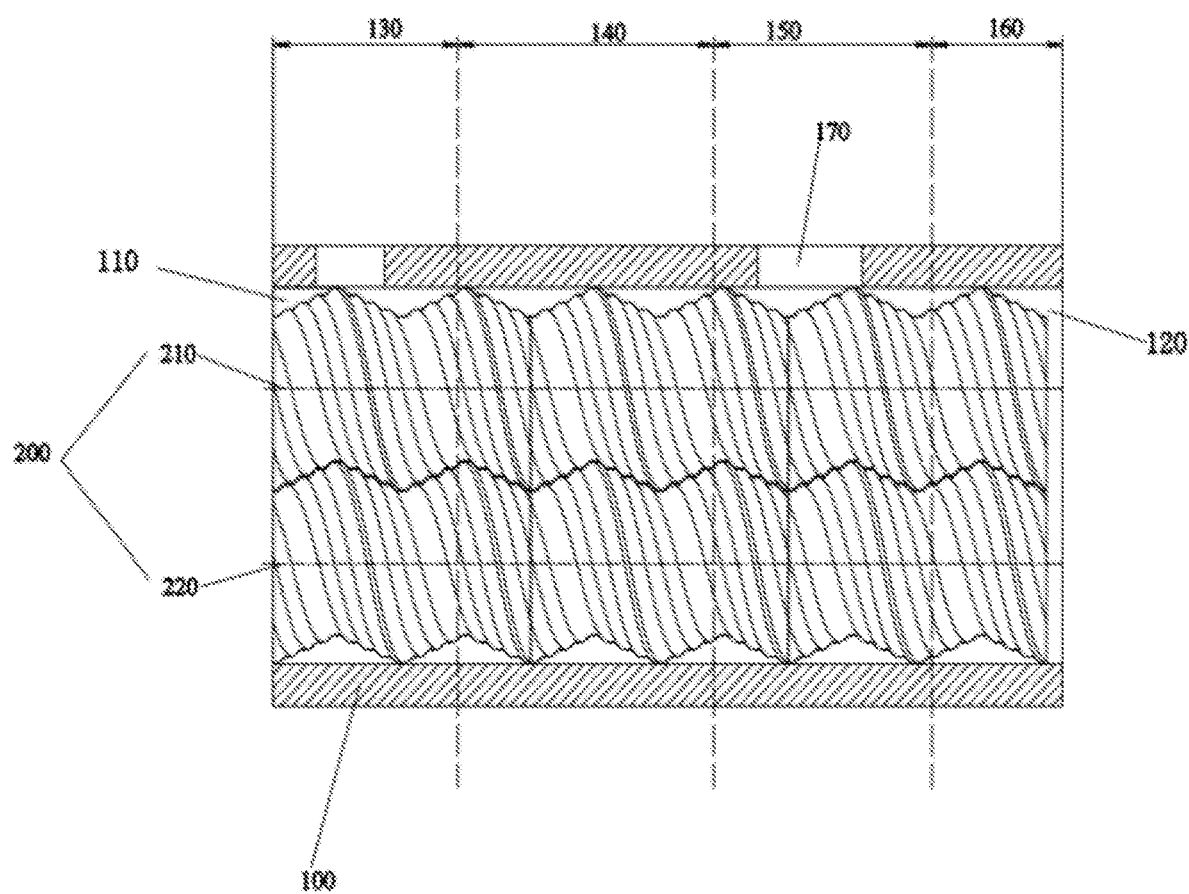
FIG. 1 is a schematic view of an extrusion device according to a first embodiment of the present disclosure.

The specific embodiments of the present disclosure will be described in detail in this section, and the preferred embodiments of the present disclosure are shown in the drawings. The purpose of the drawings is to provide supplementary information to the written description in the part of the description with graphics, so that a reader can intuitively and vividly understand each technical feature and the overall technical solution of the present disclosure, but the drawings cannot be understood as a limiting to the protection scope of the present disclosure.

In the description of the present disclosure, it shall be understood that the description regarding orientations, such as the orientation or position relationship indicated by upper, lower, front, rear, left, right, refers to the orientation or position relationship based on the drawings, which is only used for facilitating the description of the present disclosure and the simplification of description instead of indicating or implying that the indicated device or component must have a specific orientation and be constructed and operated in a specific orientation. Therefore, the description regarding orientations cannot be understood as a limiting to the present disclosure.

In the description of the present disclosure, the meaning of several refers to be one or more, and the meaning of multiple refers to be more than two. The meanings of greater than, less than, more than, etc. are understood as not including this number, while the meanings of above, below, within, etc. are understood as including this number. The first and the second are only used for the purpose of distinguishing technical features if any, and cannot be understood as indicating or implying relative importance, implicitly indicating the number of the indicated technical features or implicitly indicating the order of the indicated technical features.

In the description of the present disclosure, unless otherwise clearly defined, words such as setting, installation, connection, etc. should be understood broadly, and those skilled in the art can reasonably determine the specific meanings of the above words in the present disclosure in combination with the specific contents of the technical solution.

The embodiments of the present disclosure are further described below with reference to the drawings.

With reference to FIGS. 1-5, an asymmetric co-rotating multi-screw extrusion device according to the present disclosure, comprises a barrel 100 and a screw mechanism 200 arranged inside the barrel 100. The barrel 100 is provided with a feed port 110 located at one end of the screw mechanism 200 and a discharge port 120 located at the other end of the screw mechanism 200. The barrel 100 comprises a conveying section 130, a melting section 140, an exhaust section 150, and a mixing extrusion section 160 sequentially arranged from a side thereof where the feed port 110 is located, and the exhaust section 150 is provided with an exhaust hole 170. The screw mechanism 200 comprises a first screw 210 and a second screw arranged parallel to the first screw 210. The first screw 210 and the second screw 220 have cross-sectional profiles comprising circular arcs, forming radial steps between roots and cests thereof. The second screw 220 and the first screw 210 are asymmetrically inter-meshed and co-rotate at the same speed. Preferably, the first screw 210 and the second screw 220 have a plurality of circular arcs formed in the cross-sections thereof between the roots and the crests of the first screw 210 and the second screw 220. One or more circular arc pairs formed between the root and the crest in the cross-sections of each of the screws can break the symmetry of both the first screw 210 and the second screw 220. The corresponding circular arc pairs are tangentially inter-meshed. The screw pair have different shapes and different axial opening degrees of flow channels in upper and lower intermeshing areas, and therefore a strengthening mechanism of axial back mixing is introduced to effectively accelerate melting, plasticizing, mixing and exhaust efficiencies. On the other hand, the first screw 210 and the second screw 220 are ensured to be tightly inter-meshed and co-rotated at the same speed, and the two screws wipe with each other, thus realizing a self-cleaning effect in operation. Moreover, due to the introduction of axial back mixing, the materials are mixed more fully, which can greatly reduce the use of a kneading block, has a remarkable energy-saving effect, makes residence time distribution in the processing process narrower, and improves the processing efficiency and effect.

With reference to FIG. 1, in some embodiments of the present disclosure, the second screw 210 and the first screw 220 have spiral steps in a cylinder shape. In a mutual intermeshing process, at both sides of the steps in the cylinder shape, there exist spaces through which the materials can pass. The materials can be stirred and mixed in the spaces, thus effectively accelerating the melting, plasticizing, mixing, and exhaust efficiencies.

Figure 2:
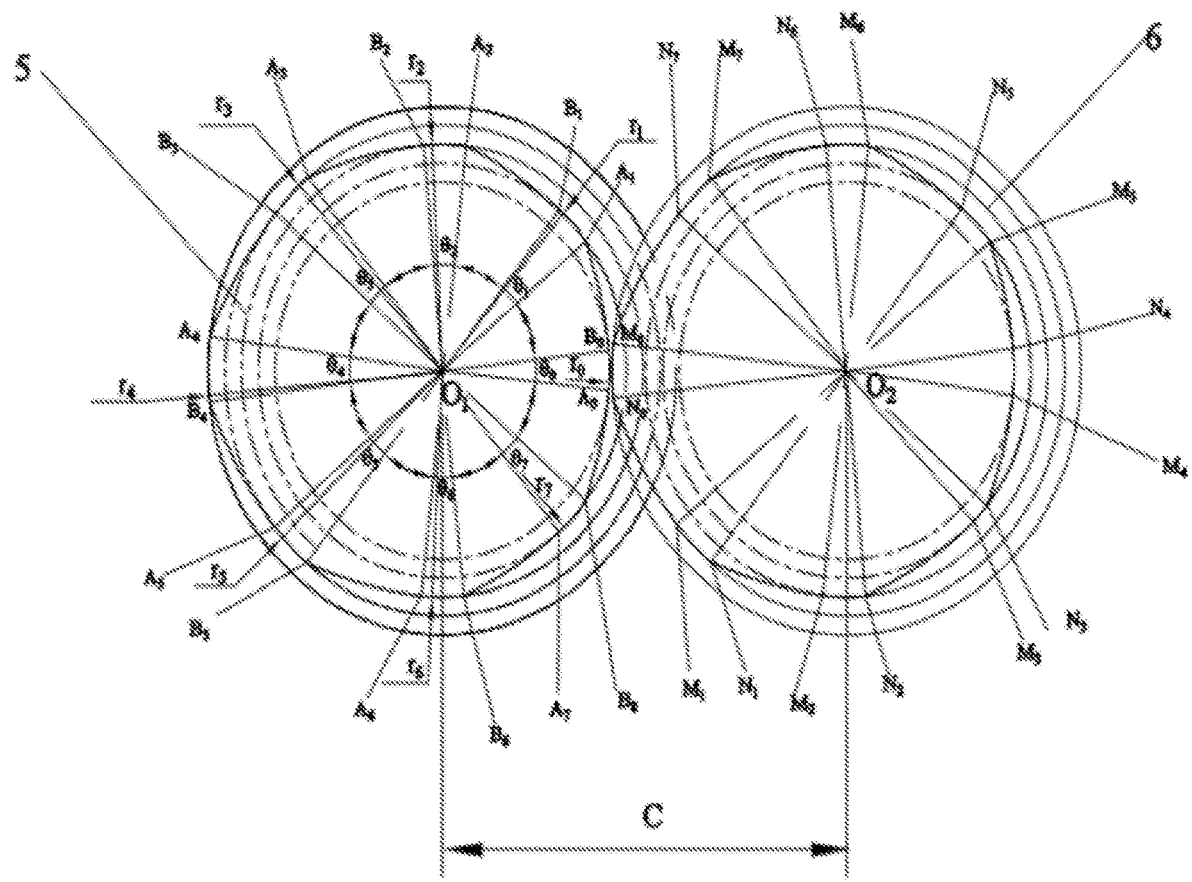
FIG. 2 is a cross-sectional view of a screw mechanism in the first embodiment of the present disclosure.

With reference to FIG. 2, in some embodiments of the present disclosure, the cross-sectional profile of the second screw 220 is formed by interconnected circular arcs and curved arcs in the same number as those of the first screw 210, and the circular arcs of the first screws 210 and the circular arcs of the second screw 220 are tangent. As a result, the first screw 210 and the second screw 220 have geometrically different end surface profiles, breaking the symmetry by having the different shapes of screws inter-meshed with each other and the different axial opening degrees of flow channels in upper and lower intermeshing areas, thereby to bring about an strengthening mechanism of axial back mixing to effectively accelerate the melting, plasticizing, mixing, and exhaust efficiencies.

Figure 3:
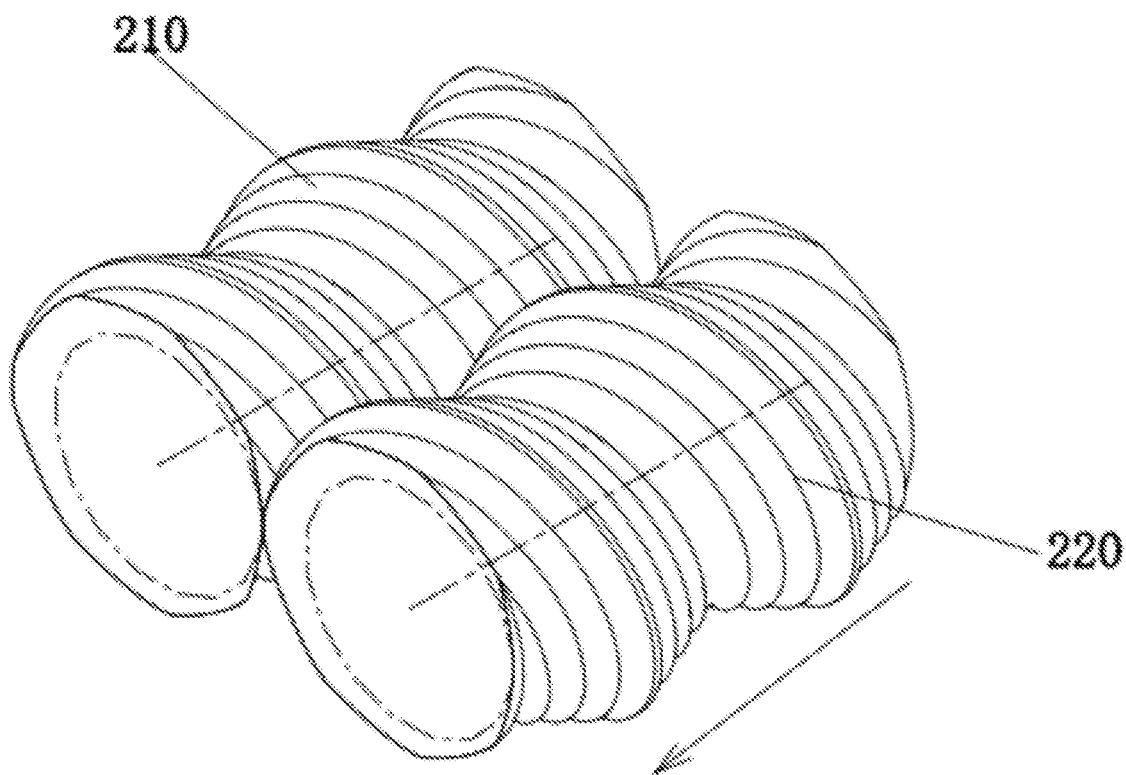
FIG. 3 is a schematic view of the screw mechanism in the first embodiment of the present disclosure.
Figure 4:
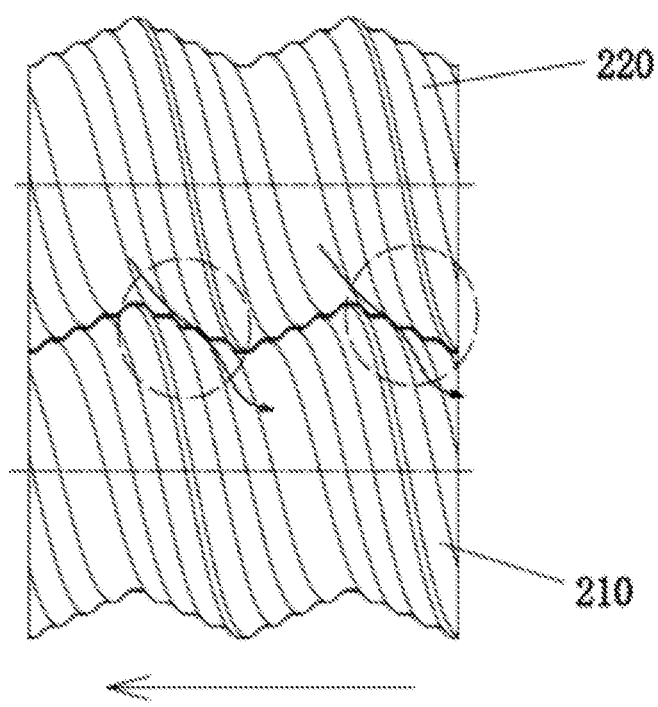
FIG. 4 is a schematic view of an upper intermeshing area of the screw mechanism in the first embodiment of the present disclosure.
Figure 5:
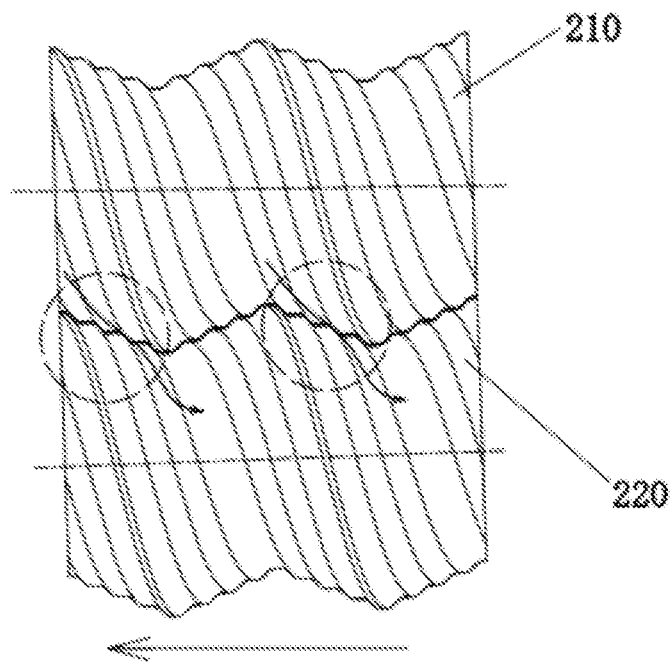
FIG. 5 is a schematic view of a lower intermeshing area of the screw mechanism in the first embodiment of the present disclosure.

According to a first embodiment of the present disclosure, the device comprises a first screw 210 and a second screw 220 which are inter-meshed with each other, as shown in FIG. 3, and has an axially opened upper intermeshing area, as shown in FIGS. 3 and 4, and an axially opened lower intermeshing area, as shown in FIG. 5. The first screw 210 and the second screw 220 and the inner cavity of the barrel form a flow channel together. When the first screw 210 and the second screw 220 co-rotate at the same speed, the two screws always keep in intermeshing contact with each other to realize a self-cleaning function. As shown in FIGS. 1 to 5, the spirals of the first screw 210 and the second screw 220 are both spiral structures with smooth edges.

The first screw 210A may be a single-head threaded component, six circular arcs with a radius $r_i$ are introduced in between the root and the crest in the cross-sectional profile of the first screw 210, wherein i=1, 3 and i=5, 7, and $d/2=r_0<r_1<r_2<r_3<r_4=D/2>r_5>r_6>r_7$. $r_0$ herein corresponds to the circular arc of the root diameter of the screw, $r_4$ corresponds to the circular arc of the crest diameter of the screw, and each of the circular arcs corresponds to a central angle $\theta_i$, for example, a central angle $\theta_0$ corresponds to the circular arc of the root diameter of the screw, and a central angle $\theta_4$ corresponds to the circular arc of the top diameter of the screw, while a circular arc corresponds to $r_1$ is $A_iB_i$, for example, a circular arc $A_0B_0$ corresponds to $r_0$, a circular arc $A_3B_3$ corresponds to $r_3$, and so on.

The second screw 220 may also be a single-head threaded component, and six circular arcs with a radius $C-r_i$ are introduced in the cross-section of the screw to be inter-meshed with the circular arc corresponding to The cross-sectional profiles of the screws are geometrically shown in FIG. 2, a centerline distance between a rotation center $O_1$ of the first screw 210 and a rotation center $O_2$ of the second screw 220 is C, maximum outer diameters of the first screw 210 and the second screw 220 are D, and inner diameters of the first screw 210 and the second screw 220 are d, then:

$d=2C-D$.

To ensure proper intermeshing operation, a certain relationship is required for the first screw 210 and the second screw 220. As shown in the drawing, the cross-sectional profile of the single-head thread of the first screw 210 is formed by eight circular arcs and eight curved arcs which are interconnected; the eight curved arcs are $B_{i-1}A_i$ in sequence, wherein i=1,7, representing the curved arcs connecting the adjacent circular arcs with a radius $r_{i-1}$ and a radius $r_i$, i.e., $B_0A_1$, $B_1A_2$, $B_2A_3$, $B_3A_4$, $B_4A_5$, $B_5A_6$, and $B_6A_7$, while $B_7A_0$ represents a curve arc connecting $r_7$ and $r_0$, when i<4, that is, for curve arcs $B_0A_1$, $B_1A_2$, $B_2A_3$, and $B_3A_4$, a central angle $\beta_i$ corresponding to the curve arc $B_{i-1}A_i$ is:

$$\beta_i = arcos\left(\sqrt{\frac{c^2+(C-r_{i-1})^2-r_i^2}{2C(C-r_{i-1})}}\right)+$$

$$antan\left(\frac{\sqrt{C-r_{i-1}}\sqrt{r_i^2-r_{i-1}^2}}{c\sqrt{2C}-\sqrt{C-r_{i-1}}\sqrt{(C-r_{i-1})^2-r_i^2+C^2}}\right), 1 \ll i \ll 4,$$

with $O_1B_{i-1}$ used as a polar axis, an auxiliary angle ε is introduced, a counterclockwise direction is set as positive, and a polar angle and a polar radius are expressed by ε, then a polar angle γ(∈) corresponding to the curved arc $B_{i-1}A_i$ is:

$$\gamma(\in) = \in + atan\left(\frac{(C-r_{i-1})\sin\epsilon}{C-(C-r_{i-1})\cos\epsilon}\right),$$

and a corresponding polar radius ρ(∈) is:

$$\rho(\in)=\sqrt{C^2+(C-r_{i-1})^2-2C\cdot(C-r_{i-1})\cos\epsilon}.$$

A central angle $\theta_i$ corresponding to a circular arc $A_iB_i$ with a radius $r_i$ meets conditions: $\theta_i \geq 0$, $\theta_0>0$ and $\theta_4>0$, and $\Sigma_{i=0}^7\theta_i=2\pi-\Sigma_{i=1}^8\beta_i$. A central angle here corresponding to a curved arc $B_7A_0$ is recorded as $\theta_8$, and similarly, polar coordinate expressions of $B_4A_5$, $B_5A_6$, $B_6A_7$, and $B_7A_0$ can also be obtained.

As shown in FIG. 2, the cross-section of the single-head threaded component of the second screw 220 is also formed by eight circular arcs and eight curved arcs which are connected, a circular arc inter-mesh with the circular arc $A_iB_i$ is marked as $M_iN_i$, a corresponding center angle is also $\theta_i$, wherein i=0,7, and a corresponding radius is $C-r_i$. In this way, curved arc profiles $N_0M_1$, $N_1M_2$, $N_2M_3$, $N_3M_4$, $N_4M_5$, $N_5M_6$, $N_6M_7$ and $N_7M_0$ can be obtained by intermeshing with the single-head threaded component of the first screw 210, and a center angle corresponding to $N_{i-1}M_i$ is also $\beta_i$, wherein i=1,7; and $N_7M_0$ corresponds to a central angle $\beta_8$.

A processing method of the embodiment described above comprises the following steps.

(1) After materials are fed into a flow channel of the conveying section 130 from the feed port 110, the first screw 210 and the second screw 220 co-rotate at the same speed along respective screw axes. The first screw 210 and the second screw 220 have an asymmetric intermeshing relationship due to the existence of a plurality of circular arcs in the cross-sectional profiles which result in different axial opening degrees in upper and lower intermeshing areas. The feeding of the materials is achieved under a combined action of a positive displacement conveying effect and a friction force between the first screw 210 and the second screw 220.

The materials are then forced to move towards a direction of a flow channel of the melting section 140.

(2) When the materials are moved into the flow channel of the melting section 140, due to the different axial opening degrees of the two screws in the upper and lower intermeshing areas, and the changes of stacking conditions of the materials in the screws, a strong axial back mixing effect is brought, which further accelerates the melting process of solid materials to melt the materials.

(3) After the melted materials enter a flow channel of the exhaust section 150 from the flow channel of the melting section 140, due to the asymmetric axial openings of the two screws in the upper and lower intermeshing areas and the changes of the stacking conditions, communication between the flow channels of different screw slots is enhanced, the exhaust area is enlarged, and the exhaust of gas from the exhaust port is accelerated, such that the exhaust of gas is more thorough. Meanwhile, the melted materials are further moved towards a direction of a flow channel of the mixing extrusion section 160 under the action of the first screw 210 and the second screw 220.

(4) After the melted materials enter the flow channel of the mixing extrusion section 160, due to the different axial opening degrees of the two screws in the upper and lower intermeshing areas and the different stacking conditions, a strong axial back mixing effect is brought, which strengthens the plasticizing and mixing effects and improves the plasticizing and mixing efficiencies. The melted materials are stably extruded from the discharge port 120. Meanwhile, a mutual wiping effect between the first screw 210 and the second screw 220 realizes a self-cleaning effect.

Figure 6:
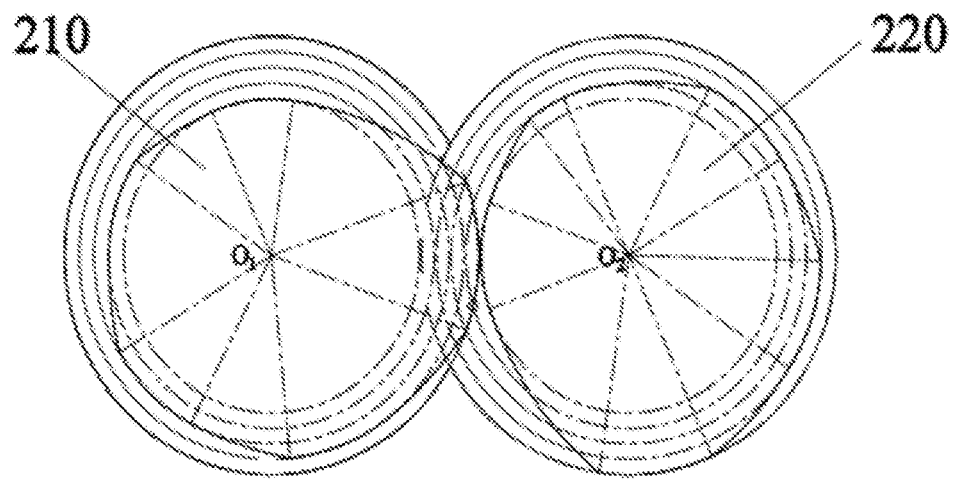
FIG. 6 is a cross-sectional view of the screw mechanism in a second embodiment of the present disclosure.
Figure 7:
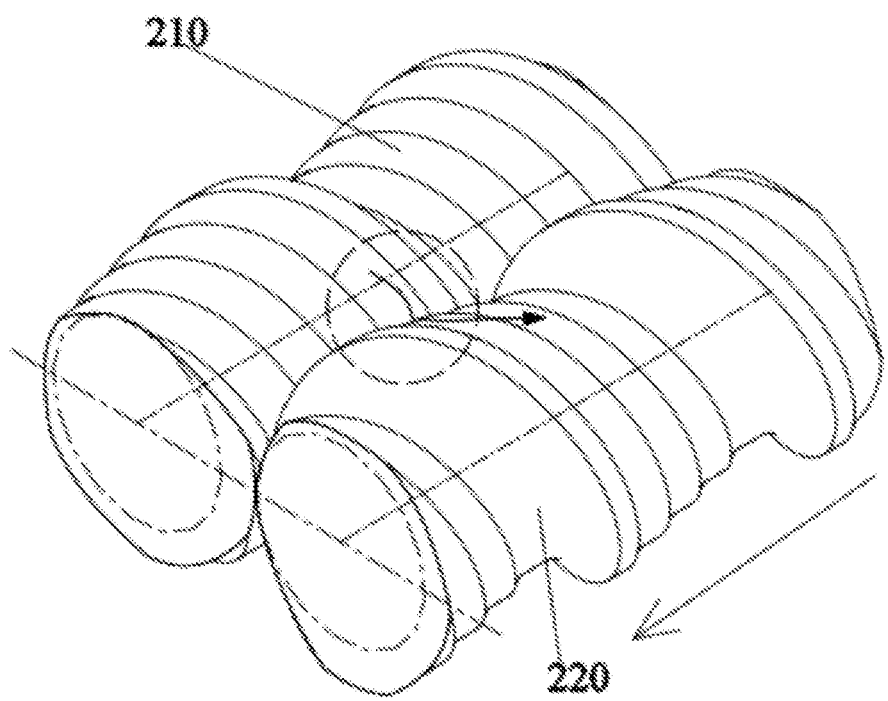
FIG. 7 is a schematic view of the upper intermeshing area of the screw mechanism in the second embodiment of the present disclosure.

Further, according to a second embodiment of the present disclosure, as shown in FIGS. 6 and 7, three circular arcs are formed between the root and the crest in the cross-sectional profile of each of the screws, thereby realizing the connection of four curved arcs at intervals. As thus, the screw has the cross-sectional profiles consisting of five circular arcs and five curved arcs. Corresponding circular arc pairs are tangentially inter-meshed, the screws inter-meshed with each other have different shapes and different axial opening degrees of flow channels in upper and lower intermeshing areas, and whereby a strengthening mechanism of axial back mixing is brought to effectively accelerate the melting, plasticizing, mixing, and exhaust efficiencies.

Figure 8:
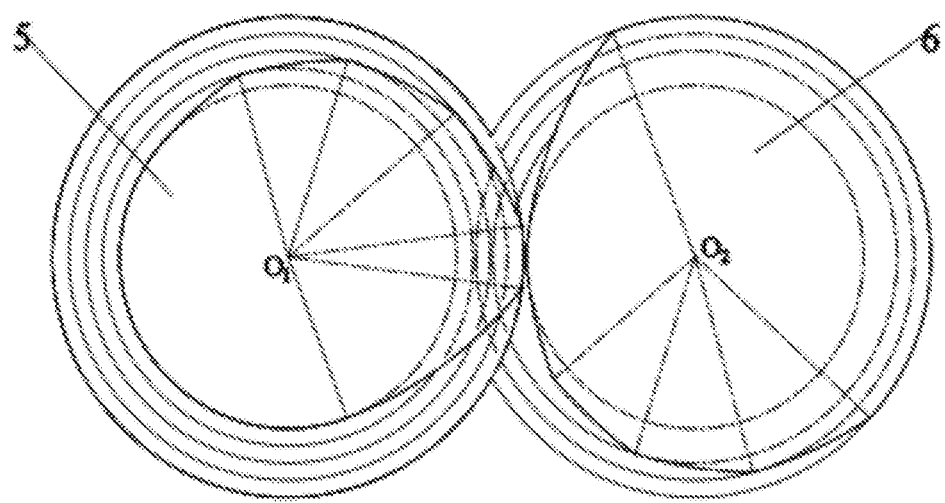
FIG. 8 is a cross-sectional view of the screw mechanism in a third embodiment of the present disclosure.
Figure 9:
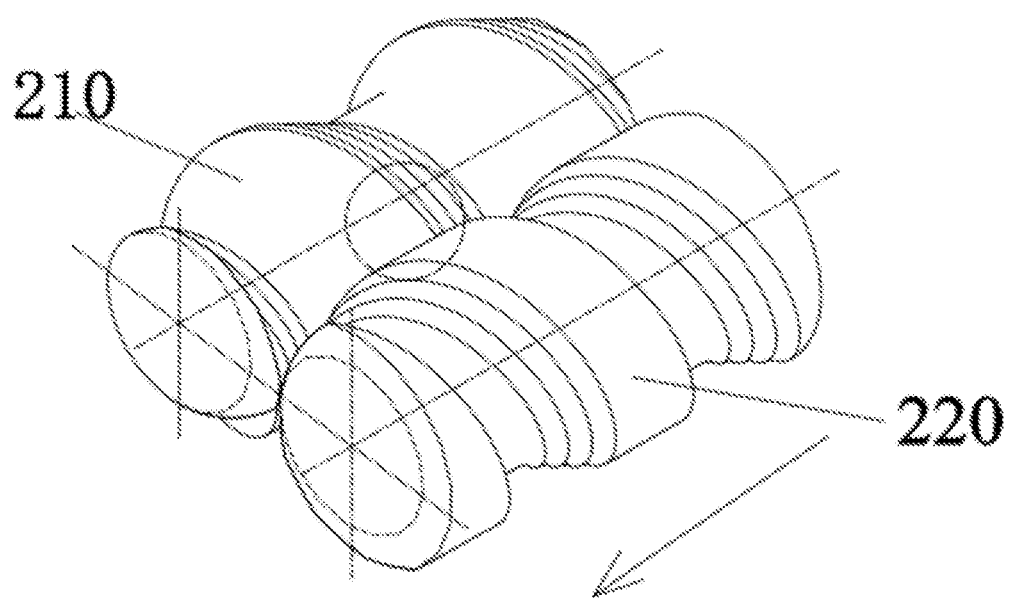
FIG. 9 is a schematic view of the upper intermeshing area of the screw mechanism in the third embodiment of the present disclosure.

Further, according to a third embodiment of the present disclosure, as shown in FIGS. 8 and 9, three circular arcs with an arc length 0 are formed between the root and the crest in the cross-sectional profile of each of the screws to realize the direct connection of four curved arcs. As thus, the screw has a cross-section consisting of two circular arcs and five curved arcs.

Figure 10:
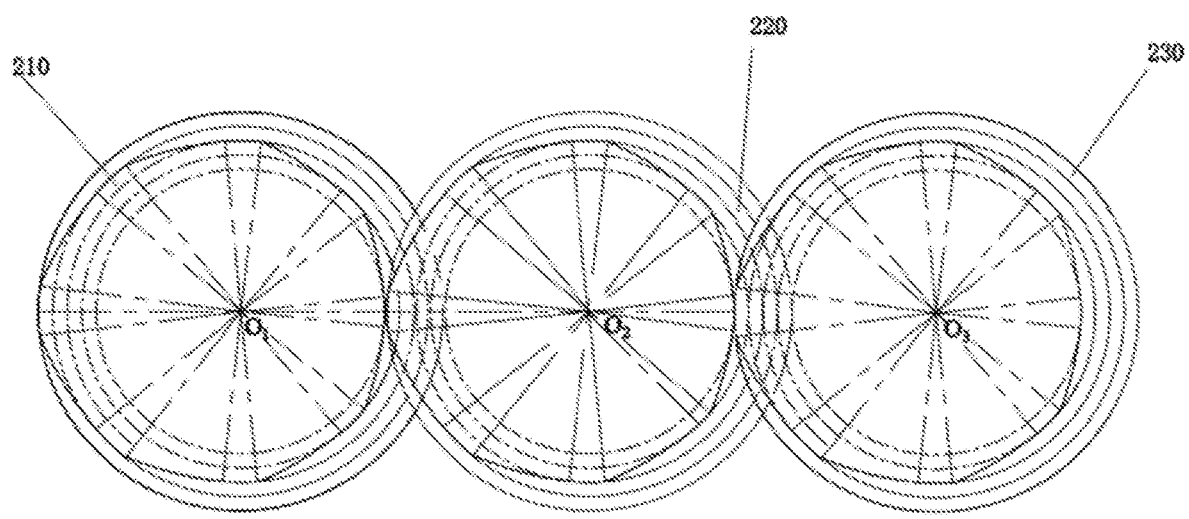
FIG. 10 is a cross-sectional view of three screws in a fourth embodiment of the present disclosure.

Further, according to the third embodiment of the present disclosure, as shown in FIG. 10, the screw mechanism 200 further comprises a third screw 230 asymmetrically intermeshed with the first screw 210 or the second screw 220. The third screw 230 has a cross-sectional profile comprising one or more circular arcs between the root and the crest of the third screw 230. The third screw 230 has the same structure as that of the first screw 210. The first screw 210, the second screw 220, and the third screw 230 are connected in sequence to form a three-screw arrangement in a straight line. The screws have asymmetric intermeshing and axial back mixing therebetween, thus ensuring the self-cleaning function as well as a higher yield, having narrower residence time distribution and improved processing efficiency.

In some embodiments, the first screw 210, the second screw 220 and the third screw 230 are all double-headed screws. With the use of the double-headed structure, due to the increased number of threads, the screws provide higher average shear rate and shear force applied to the materials, allowing the materials to be more fully mixed, and the axial back mixing to be more intense, for the strengthened plasticizing and mixing effects and the higher plasticizing and mixing efficiencies are. The melted materials can be stably extruded from the discharge port 120.

In some embodiments, in addition, the screw mechanism 200 may be provided with a left-hand thread structure and a kneading block structure arranged at a local position thereof. When the screws rotate, the left-hand thread structure and the kneading block structure are driven to rotate together, to obtain an improved mixing degree of the materials, and a strengthened mixing effect. Therefore, a more sufficient mixing is achieved, and the plasticizing and mixing outcomes are further improved.

In some embodiments, the outermost edges of the first screw 210 and the second screw 220 are tangent to an inner wall of the barrel 100, and thus the inner wall can be cleaned during the mixing operation, thus ensuring that the materials are not remained on the inner wall of the barrel 100.

The preferred embodiments of the present disclosure are described with the specific structure and size data above in detail, but the present disclosure is not limited to the embodiments, those skilled in the art may make various equal deformations or replacements without departing from the spirit of the present disclosure, and these equal deformations or replacements are all included in the scope defined by the claims of the application.

What is claimed is:

1. An asymmetric co-rotating multi-screw extrusion device, comprising:
    a barrel, and
    a screw mechanism, arranged inside the barrel,
    wherein,
        the barrel is provided with a feed port located at one end of the screw mechanism and a discharge port located at another end of the screw mechanism, and the barrel comprises a conveying section, a melting section, an exhaust section, and a mixing extrusion section sequentially arranged from a side thereof where the feed port is located, wherein the exhaust section is provided with an exhaust hole; and
        the screw mechanism comprises at least a first screw and a second screw arranged parallel to the first screw, wherein of the first screw and the second screw comprise a cross-sectional profile comprising a plurality of circular arcs forming a plurality of radial steps between roots and crests of the first screw and the second screw, and the first screw and the second screw are asymmetrically inter-meshed and co-rotate at a same speed;
        the cross-sectional profile of the first screw is formed by circular arcs of the plurality of circular arcs and curved arcs which are connected;
        the cross-sectional profile of the second screw is formed by circular arcs of the plurality of circular arcs and curved arcs which are connected;
        a number of the circular arcs and the curved arcs of the second screw is a same as that of the circular arcs and the curved arcs of the cross-sectional profile of the first screw; and
        the circular arcs of the second screw are tangent to corresponding circular arcs of the first screw.

2. The asymmetric co-rotating multi-screw extrusion device according to claim 1, wherein the second screw and the first screw have spirals which are steps in a circular cylinder shape.

3. The asymmetric co-rotating multi-screw extrusion device according to claim 1, wherein the screw mechanism further comprises a third screw asymmetrically inter-meshed with the first screw or the second screw, and the third screw comprises a cross-sectional profile comprising one or more circular arcs formed between a root and a crest thereof.

4. The asymmetric co-rotating multi-screw extrusion device according to claim 3, wherein the first screw, the second screw, and the third screw are double-headed screws.

5. The asymmetric co-rotating multi-screw extrusion device according to claim 1, wherein the screw mechanism comprises a left-hand thread structure and a kneading block structure installed at a local position therein.

6. The asymmetric co-rotating multi-screw extrusion device according to claim 1, wherein the first screw and the second screw have outermost edges tangent to an inner wall of the barrel.

7. A multi-screw extruder, comprising:
an asymmetric co-rotating multi-screw extrusion device, wherein the asymmetric co-rotating multi-screw extrusion device comprises
a barrel, and
a screw mechanism, arranged inside the barrel, wherein,
the barrel is provided with a feed port located at one end of the screw mechanism and a discharge port located at another end of the screw mechanism, and the barrel comprises a conveying section, a melting section, an exhaust section, and a mixing extrusion section sequentially arranged from a side thereof where the feed port is located, wherein the exhaust section is provided with an exhaust hole; and
the screw mechanism comprises at least a first screw and a second screw arranged parallel to the first screw, wherein the first screw and the second screw comprise a cross-sectional profile comprising a plurality of circular arcs forming a plurality of radial steps between roots and crests of the first screw and the second screw, and the first screw and the second screw are asymmetrically inter-meshed and co-rotate at a same speed;
the cross-sectional profile of the first screw is formed by circular arcs of the plurality of circular arcs and curved arcs which are connected;
the cross-sectional profile of the second screw is formed by circular arcs of the plurality of circular arcs and curved arcs which are connected;
a number of the circular arcs and the curved arcs of the second screw is a same as that of the circular arcs and the curved arcs of the cross-sectional profile of the first screw; and,
the circular arcs of the second screw are tangent to corresponding circular arcs of the first screw.

8. A processing method performed on an asymmetric co-rotating multi-screw extrusion device, wherein the asymmetric co-rotating multi-screw extrusion device comprises a barrel and a screw mechanism arranged inside the barrel, wherein the barrel is provided with a feed port located at one end of the screw mechanism and a discharge port located at another end of the screw mechanism, and the barrel comprises a conveying section, a melting section, an exhaust section, and a mixing extrusion section sequentially arranged from a side thereof where the feed port is located, wherein the exhaust section is provided with an exhaust hole, wherein the screw mechanism comprises at least a first screw and a second screw arranged parallel to the first screw, wherein the first screw and the second screw comprise a cross-sectional profile comprising a plurality of circular arcs forming a plurality of radial steps between roots and crests of the first screw and the second screw, and the first screw and the second screw are asymmetrically inter-meshed and co-rotate at a same speed, and wherein the cross-sectional profile of the first screw is formed by circular arcs of the plurality of circular arcs and curved arcs which are connected, wherein the cross-sectional profile of the second screw is formed by circular arcs of the plurality of circular arcs and curved arcs which are connected, wherein a number of the circular arcs and the curved arcs of the second screw is a same as that of the circular arcs and the curved arcs of the cross-sectional profile of the first screw, and wherein the circular arcs of the second screw are tangent to corresponding circular arcs of the first screw, and wherein the processing method comprises:
pushing materials to move forward in a direction towards a flow channel of the melting section, by co-rotating the first screw and the second screw at the same speed along respective screw axes, after the materials are fed into a flow channel of the conveying section from the feed port;
melting the materials to melt, through an accelerated melting process due to a strong axial back mixing effect, when the materials are moved into the flow channel of the melting section,
venting gas from the exhaust section under an action of the first screw and the second screw, and further moving the materials in a direction towards a flow channel of the mixing extrusion section, after the materials that are melted are moved into a flow channel of the exhaust section from the flow channel of the melting section; and
plasticizing and mixing the materials that are melted under the strong axial back mixing effect between the first screw and the second screw, and stably extruding the materials that are melted from the discharge port, after the materials that are melted are moved into the flow channel of the mixing extrusion section.

* * * * *